UNITED STATES PATENT OFFICE.

AUGUST FOELSING, OF OFFENBACH-ON-THE-MAIN, GERMANY.

PROCESS FOR THE PRODUCTION OF PURE CAOUTCHOUC.

No. 894,490.  Specification of Letters Patent.  Patented July 28, 1908.

Application filed September 14, 1906. Serial No. 334,610.

*To all whom it may concern:*

Be it known that I, AUGUST FOELSING, a subject of the German Emperor, and resident of 10 Körnerstrasse, Offenbach-on-the-Main, Germany, chemist, have invented a certain new and useful Process for the Production of Pure Caoutchouc, of which the following is an exact specification.

My invention relates to a new and useful process for the production of caoutchouc from plants. The processes hitherto in use for this purpose produce neither a pure nor a particularly valuable caoutchouc, the expense being very great compared with the quality of the material produced.

The so-called pure caoutchouc even when freed from resin oily substances, wax and similar materials is very liable to oxidation, is dark colored, and soon becomes sticky and soft and loses its elasticity.

A satisfactory caoutchouc must not be too dark colored and must only have a small percentage of resin. It must be free from albumen and other substances such as glucosides, tannins, *i. e.* substances liable to fermentation. Caoutchoucs during fermentation smell very disagreeable and those liable to oxidation become sticky, hard and lose their elastic properties. Furthermore a satisfactory caoutchouc must not greatly deteriorate when washed, must be tenacious and highly elastic. For obtaining such a caoutchouc rough materials which will allow the caoutchouc to coagulate easily within the rinds, leaves, roots, fruits and the like must be chosen. Firstly the rinds, leaves and the like must be from trees or young caoutchouc plants, which can be best obtained by cultivating caoutchouc plants in the same manner as oak-tan-hedges, from which after about two or three years, the young caoutchouc trunks are cut and after some days decorticated. The rind thus obtained contains already coagulated caoutchouc. The following are suitable plants possessing such caoutchouc. *Kickxia elastica Preuss* (identical with *Funtumia elastica Stapf*). *Ficus elastica Roxb* (identical with *Urostigma elasticum Miq.*) *Ficus Schlechteri Ward* (but it is preferable to use *Kickxia* instead of the two *Ficus* kinds); also the vegetables delivering the so-called root-caoutchouc: *Landolphia Thollonii Dew. Carpodinus leukantha K. Schum* and *Carpodinus chylorrhiza K. Schum*, furthermore some *Clitandra* kinds come into consideration, especially valuable for the culture *id: Clitandra Arnoldiana de Wild* and *Clitandria Nzunde de Wild*.

Of the so-called *Caoutchoucliana* the highly valuable *Landolphia dondeensis Busse*, which was discovered by Dr. Walther Busse in the leguminose-forests of the Donde-territory in the German east-Africa should also be mentioned. Finally for obtaining pure caoutchouc, fruits containing the mistletoe-caoutchouc, may be used, for example the fruit of the large-fructiferous caoutchouc-mistletoe *Strutanthus syringfolius Mart.*, of the mean-fructiferous *Phthirusa theobromæ* (*Willd.*) *Eichl.* and the small fructiferous caoutchouc mistletoe *Phthirusa* (H. B. K.) *Eichl.*, *Phoradendron Giord nae Warb.*, *Phoradendron Knoopii Warb.* and *Strutanthus Roversii Warb.* When using root-lianaes and caoutchouc-lianaes the decorticating may be dispensed with.

When the rinds and the branches of the root and caoutchouc-lianaes and of the mistletoe fruits, having been cut in length of about one meter and tied in bundles they are allowed to dry for a short time, this causing perfect coagulation of the caoutchouc contained therein. After this the rough material is disintegrated preferaby by means of a disintegrator.

The rough material after disintegration is boiled together with calcium and magnesium-sulfite dissolved in sulfurous acid, (about 10% of the rough material) for several hours in closed boiling apparatus eventually closed by lead.

By this operation the coloring matter is destroyed, and tannin or other substances are extracted. The lye is removed, and after having been thoroughly washed, the residue is put into suitable extraction apparatus and boiled for several hours together with acetone, methyl- or ethyl- alcohol to extract the resin, oily or wax-like substances. This is continued until a sample of the solution leaves no residue. In order to obtain a perfectly pure caoutchouc; the material remaining in the extracting apparatus is now treated with means for dissolving caoutchouc such as benzol, petroleum-ether, toluol, carbon tetrachlorid, or similar substances, till a sample of the solvent having passed the material leaves no residue when evaporated. From the caoutchouc solution the caoutchouc is now obtained by evaporating the same in a vacuum or in any other suitable manner. When this is completed there remains in the apparatus a perfectly pure, non-oxidizing tenacious, highly elastic caoutchouc free from color, tannin, albumen, glucoside, etheric or fat oils, wax and resin, which may be easily removed from the apparatus. The material freed from the mentioned substances consists chiefly of cellulose and caoutchouc, which may be separated from each other by mechanical treatment such as knurled rollers-washing-machines, or by wet globular-washing-machines.

Having thus fully described the nature of my invention, what I desire to secure by Letters Patent of the United States is:—

1. Process for the production of pure caoutchouc from caoutchouc plants consisting in treating the disintegrated raw material with a hot solution of the sulfid of an alkaline earth metal in sulfurous acid, treating the partly purified product with an alcohol and then treating the remaining material with a hydrocarbon for dissolving the caoutchouc and evaporating said hydrocarbon for obtaining the dissolved pure caoutchouc.

2. Process for the production of pure caoutchouc from caoutchouc plants consisting in boiling the disintegrated raw material with a solution of calcium and magnesium sulfid in sulfurous acid, treating the partly purified substance with an alcohol, dissolving the pure caoutchouc in the remaining product in naphtha and evaporating off the solvent for the purpose of securing said pure caoutchouc.

In witness whereof I have hereunto set my hand in the presence of two witnesses.

AUGUST FOELSING.

Witnesses:
OTTO W. HELLMRICH,
IDA CHR. HAFERMANN.